United States Patent
John et al.

(10) Patent No.: US 12,085,964 B2
(45) Date of Patent: Sep. 10, 2024

(54) SMART PRESSURE REGULATOR FOR EMERGENCY EVACUATION INFLATION SYSTEM

(71) Applicant: GOODRICH CORPORATION, Charlotte, NC (US)

(72) Inventors: Poly Puthur John, Banglore (IN); Ashish Kumar Agarwal, Bangalore (IN); Petchi Subramanian, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/857,829

(22) Filed: Jul. 5, 2022

(65) Prior Publication Data
US 2023/0175608 A1 Jun. 8, 2023

(30) Foreign Application Priority Data

Dec. 3, 2021 (IN) .............................. 202141056154

(51) Int. Cl.
| | |
|---|---|
| *G05D 16/20* | (2006.01) |
| *B64D 25/14* | (2006.01) |
| *F16K 31/04* | (2006.01) |
| *F16K 31/06* | (2006.01) |
| *F16K 37/00* | (2006.01) |

(52) U.S. Cl.
CPC ........... *G05D 16/202* (2013.01); *B64D 25/14* (2013.01); *F16K 31/046* (2013.01); *F16K 31/0644* (2013.01); *F16K 31/0648* (2013.01); *F16K 31/0655* (2013.01); *F16K 31/0658* (2013.01);
(Continued)

(58) Field of Classification Search
CPC ...... F16K 31/04; F16K 31/046; F16K 37/005; F16K 31/0644; F16K 31/0648; F16K 31/0655; F16K 31/0658; F16K 31/0668; G05D 16/202; G05D 16/2022; B64D 25/14
See application file for complete search history.

(56) References Cited

U.S. PATENT DOCUMENTS 4,976,460 A * 12/1990 Newcombe ........ G05D 23/1393
                                                                236/12.12
5,002,465 A    3/1991 Lagen et al.
(Continued)

FOREIGN PATENT DOCUMENTS

| DE | 19516887 A1 * | 11/1996 | ........... F16K 31/046 |
| DE | 20318684 U1 * | 4/2004  | ........... F02D 19/027 |

(Continued)

OTHER PUBLICATIONS

European Patent Office, European Search Report dated Mar. 24, 2023 in Application No. 22210004.2.

*Primary Examiner* — Atif H Chaudry
(74) *Attorney, Agent, or Firm* — SNELL & WILMER L.L.P.

(57) ABSTRACT

A valve arrangement for a pressurized fluid source includes a regulating valve poppet configured to translate along a longitudinal axis of a valve housing, and a linear stepper motor configured to control a position of the regulating valve poppet. The linear stepper motor is controlled by a closed loop control system based upon temperature and pressure feedback signals to actively control the position and stroke rate of the regulating valve poppet.

17 Claims, 6 Drawing Sheets

(52) U.S. Cl.
CPC ........ *F16K 31/0668* (2013.01); *F16K 37/005* (2013.01); *G05D 16/2022* (2019.01)

(56) References Cited

U.S. PATENT DOCUMENTS

| | | | |
|---|---|---|---|
| 5,536,232 A | 7/1996 | Farrell et al. | |
| 6,539,968 B1* | 4/2003 | White | G05D 7/0635 |
| | | | 138/44 |
| 9,403,598 B2* | 8/2016 | Deshpande | F17C 1/00 |
| 2004/0094671 A1 | 5/2004 | Moro et al. | |
| 2013/0312730 A1* | 11/2013 | Stark | F16K 37/0058 |
| | | | 126/116 A |
| 2016/0252913 A1* | 9/2016 | Hirata | F16K 7/14 |
| | | | 137/486 |
| 2020/0094976 A1 | 3/2020 | John et al. | |

FOREIGN PATENT DOCUMENTS

| | | |
|---|---|---|
| EP | 3686466 | 7/2020 |
| JP | H0718508 B2 * | 3/1995 |

\* cited by examiner

SMART PRESSURE REGULATOR FOR EMERGENCY EVACUATION INFLATION SYSTEM

CROSS-REFERENCE TO RELATED APPLICATIONS

This application claims priority to, and the benefit of, India Patent Application No. 202141056154, filed Dec. 3, 2021 (DAS Code 81DB) and titled "SMART PRESSURE REGULATOR FOR EMERGENCY EVACUATION INFLATION SYSTEM," which is incorporated by reference herein in its entirety for all purposes.

FIELD

The present disclosure relates generally to inflatable fluid sources and, more particularly, to a valve arrangement for a pressurized fluid source of an evacuation assembly.

BACKGROUND

Inflatable evacuation systems may be found on various structures, including aircraft, boats, offshore drilling platforms and the like. The systems are typically equipped with an inflatable or an inflatable device, such as, for example, an inflatable slide or an inflatable raft, configured to facilitate rapid evacuation of persons in the event of an emergency. Such inflatables are typically stored in an uninflated condition on the structure in a location readily accessible for deployment. For example, an evacuation slide for a commercial aircraft is stored in an uninflated condition in a case or compartment located proximate an emergency exit.

Systems used to inflate evacuation slides typically employ a gas stored within a cylinder or tank at high pressure, which is discharged into the evacuation slide (or into an inflatable tube comprised within the evacuation slide) within a specific time period. This may be accomplished, for example, by opening a main inflation valve that connects the high-pressure gas to the inflatable tube.

SUMMARY

A valve arrangement for a pressurized fluid source is disclosed. The valve arrangement comprises a valve housing comprising an inlet, an outlet, and a main fluid channel extending along a longitudinal axis of the valve housing, a regulating valve poppet located in the main fluid channel, the regulating valve poppet configured to translate along the longitudinal axis of the valve housing, and a linear stepper motor configured to control a position of the regulating valve poppet.

In various embodiments, the regulating valve poppet comprises a shaft and a plug.

In various embodiments, the valve arrangement further comprises a valve seat land, wherein a valve face of the plug is configured to abut the valve seat land when the regulating valve poppet is in a closed position, and the inlet is sealed from the outlet in response to the regulating valve poppet moving to the closed position.

In various embodiments, the valve arrangement further comprises a spring abutting the plug, wherein the spring biases the plug towards the valve seat land. In various embodiments, the valve arrangement further comprises a dynamic O-ring seal configured to fluidically isolate the linear stepper motor from the main fluid channel.

In various embodiments, the valve arrangement further comprises a controller, wherein the linear stepper motor is operated with the controller.

In various embodiments, the valve arrangement further comprises a pressure sensor, wherein the controller is configured to receive a pressure feedback signal and the controller is configured to control the linear stepper motor based upon the pressure feedback signal.

In various embodiments, the valve arrangement further comprises a temperature sensor, wherein the controller is configured to receive a temperature feedback signal and the controller is configured to control the linear stepper motor based upon the temperature feedback signal.

In various embodiments, the valve arrangement further comprises a power source for powering the linear stepper motor.

In various embodiments, the controller is configured to vary a stroke speed of the regulating valve poppet based upon the temperature feedback signal.

In various embodiments, the controller is configured to vary a stroke position of the regulating valve poppet based upon the pressure feedback signal.

A valve arrangement for a pressurized fluid source is disclosed, The valve arrangement comprises a valve housing comprising an inlet, an outlet, and a main fluid channel, a regulating valve poppet located in the main fluid channel, the regulating valve poppet configured to translate along a longitudinal axis, and a linear stepper motor configured to control a position of the regulating valve poppet. The outlet is fluidly disconnected from the inlet when the regulating valve poppet is in a closed position. The outlet is fluidly connected with the inlet when the regulating valve poppet is in an open position.

In various embodiments, the main fluid channel fluidly connects the inlet and the outlet.

In various embodiments, the valve arrangement further comprises a pressure sensor, wherein a controller is configured to receive a pressure feedback signal from the pressure sensor and the controller is configured to control the linear stepper motor based upon the pressure feedback signal.

In various embodiments, the valve arrangement further comprises a temperature sensor, wherein a controller is configured to receive a temperature feedback signal from the temperature sensor and the controller is configured to control the linear stepper motor based upon the temperature feedback signal.

In various embodiments, the controller is configured to vary a stroke speed of the regulating valve poppet based upon the temperature feedback signal.

In various embodiments, the controller is configured to vary a stroke position of the regulating valve poppet based upon the pressure feedback signal.

In various embodiments, the valve arrangement further comprises a spring configured to bias the regulating valve poppet toward the closed position.

An evacuation assembly is disclosed, comprising a pressurized fluid source and a valve assembly configured to control a flow of pressurized fluid from the pressurized fluid source. The valve assembly comprises a valve housing comprising an inlet, an outlet, and a main fluid channel extending along a longitudinal axis of the valve housing, a regulating valve poppet located in the main fluid channel, the regulating valve poppet configured to translate along the longitudinal axis of the valve housing, and a linear stepper motor mounted to the valve housing and configured to control a position of the regulating valve poppet.

In various embodiments, the evacuation assembly further comprises a temperature sensor, wherein an operating speed of the linear stepper motor is variable based upon a temperature feedback signal received from the temperature sensor, and a pressure sensor, wherein a position of the linear stepper motor is variable based upon a pressure feedback signal received from the pressure sensor.

In various embodiments, the evacuation assembly further comprises an evacuation slide fluidly coupled to the valve outlet.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
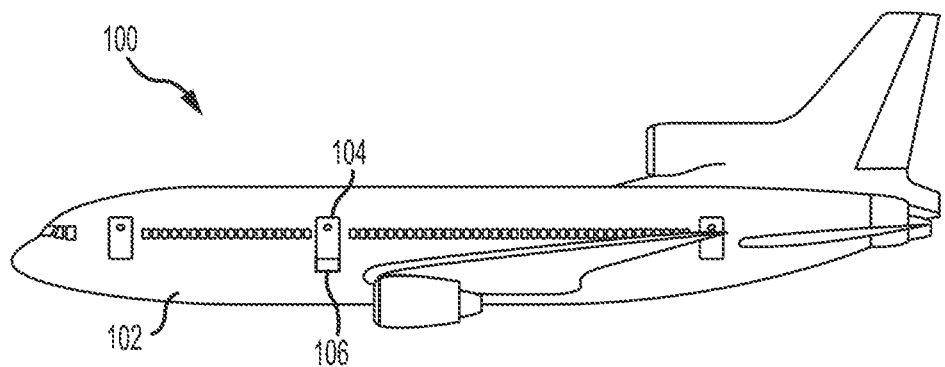
FIG. 1 illustrates an aircraft having an evacuation assembly, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step.

Also, any reference to attached, fixed, connected or the like may include permanent, removable, temporary, partial, full and/or any other possible attachment option.

Surface lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

The systems and methods disclosed herein may find particular use in connection with aircraft evacuation assemblies. However, various aspects of the disclosed systems and methods may be adapted for performance in a variety of other inflatable assemblies, for example, inflatable raft assemblies, and/or any other assemblies having charged cylinders. As such, numerous applications of the present disclosure may be realized.

Conventional pressure regulator units are typically acceptance tested for desired pressure characteristics over time using a pressurized gas bottle, aspirators, and feed hoses. Flow performance is typically achieved by the shaping of a poppet control profile and its positioning within a control orifice. The shaped profile of the poppet in conjunction with body orifice constitutes the flow area which is variable with poppet travel. The positioning of the poppet or the poppet travel is influenced by the applicable force balancing between a spring and fluid pressure forces. Initially at the start of inflation, the bottle pressure force is higher and the poppet stroke is less. Because of higher bottle pressure, sufficient flow outage at higher pressures are maintained at the regulator outlet. As the inflation progress, the bottle pressure reduces with time and the poppet stroke increases in passive mode. This stroke increase tends not to be enough to maintain same level of outlet pressure achieved during the initial phase. Thus, the flow outlet pressure reduces over time with inflation. Accordingly, the inflation build up rate decreases and the time duration to achieve the desired inflation increases.

Figure 4:
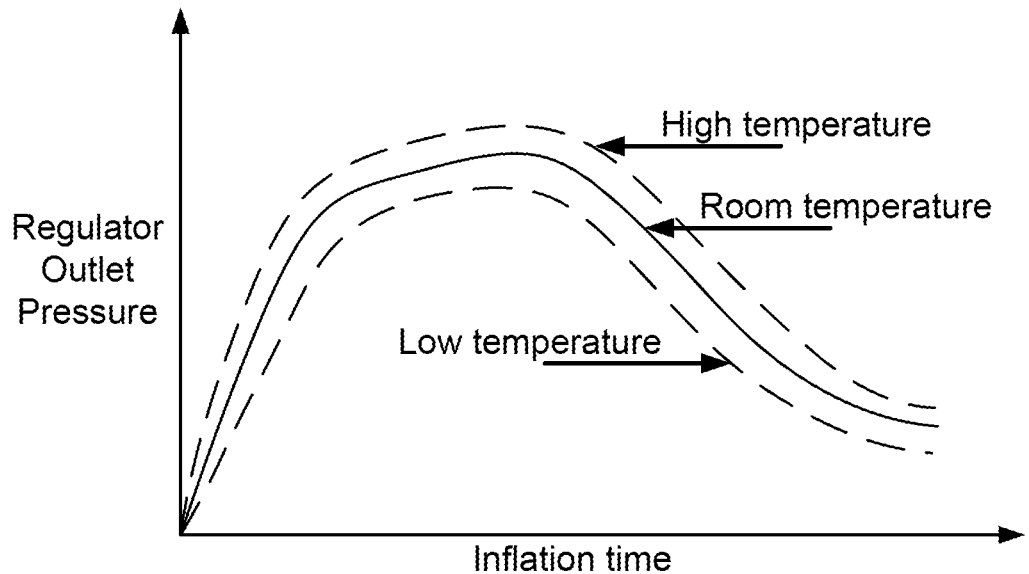
FIG. 4 illustrates a regulator outlet pressure curve, in accordance with various embodiments.

This regulator performance varies with operating temperatures, as shown in FIG. 4. The outlet pressure values increase with operating temperatures and decrease at lower temperatures. Because conventional pressure regulators typically operate in self-acting passive mode, no active corrections are possible to compensate for these performance variations. Some level of design-driven partial correction may be possible as the force balancing varies with fluid pressures influenced by the operating temperatures. Thus, at lower operating temperatures this regulator opening area tends to increase and decrease at higher temperatures. Accordingly, inflation will be faster at elevated temperatures and be slower at lower temperatures.

A pressure reducing regulator of the present disclosure is designed to eliminate the above performance drawbacks of conventional pressure regulators and to improve the inflation system performance. Using a pressure reducing regulator of the present disclosure, similar outlet pressure values can be achieved throughout the inflation time and this would reduce the inflation time further. Moreover, regulator performance variation with temperature can be eliminated with a pressure reducing regulator of the present disclosure. A pressure reducing regulator of the present disclosure can be integrated with flow shut off functions with good leak tightness. A pressure reducing regulator of the present disclosure may eliminate the need for a separate isolation or shut off valve.

A pressure reducing regulator of the present disclosure may utilize closed loop pressure controls with a DC linear stepper motor operated pressure control valve. This electrically operated valve may be designed with flow shut off and pressure reducing regulating features. Thus, no separate flow shut off may be necessary. A pressure reducing regulator of the present disclosure may be operated repeatedly in component and system level and no re-setting (e.g., such as tends to be necessary in conventional manual operating regulator units) is necessary.

Because it is possible to increase the regulator flow area actively with a pressure reducing regulator of the present disclosure, the outlet flow rate may be increased to achieve higher pressures during inflation. For a specified gas bottle pressure, almost steady uniform regulator pressure values may be maintained during inflation with a pressure reducing regulator of the present disclosure. By this, the inflatable inflation time can be reduced and the overall evacuation time can be reduced from existing systems.

In various embodiments, regulator performance variation with ambient temperatures may be reduced and/or eliminated by utilizing a pressure reducing regulator of the present disclosure. Different regulated pressure profiles may be easily achieved by varying the conical poppet profile. In various embodiments, a standard off the shelf linear stepper motor may be used with a pressure reducing regulator of the present disclosure. The motor output is linear movement and the position can be adjusted by controlling the number of DC voltage pulses. The speed of the linear movement can be controlled by varying the frequency of the DC voltage pulses supplied to the motor. A stepper motor may simplify the design as it may not require any position control feedback and related servo control schemes, such as those utilized by conventional pressure regulating servo valves. The actuation load requirement may be minimized by utilizing the pressure balancing features possible due to O-ring dynamic seals provided in a pressure reducing regulator of the present disclosure.

A pressure reducing regulator of the present disclosure is electrically operated with intelligence added operational features. A pressure reducing regulator of the present disclosure may have repeated on/off operational features. Thus, a pressure reducing regulator of the present disclosure may be used for the inflatable application to stop excess gas from flowing after inflated to the desired pressure.

Being a pressure reducing regulator, temperature of the fluid reduces due to gas expansion at higher pressure drops and fluid freezing may tend to occur inside the regulator, in various embodiments. Because this design uses electrically driven devices with a controller, heating elements may be more easily implemented to heat the pressure reducing regulator to avoid ice from forming. A pressure reducing regulator of the present disclosure may be used across various platforms.

Referring now to FIG. 1, an aircraft 100 is shown. Aircraft 100 may include a fuselage 102 having plurality of exit doors, including exit door 104. Aircraft 100 may include one or more evacuation assemblies positioned near a corresponding exit door. For example, aircraft 100 includes an evacuation assembly 106 positioned near exit door 104. In the event of an emergency, exit door 104 may be opened by a passenger or crew member of aircraft 100. In various embodiments, evacuation assembly 106 may deploy in response to exit door 104 being opened or in response to another action taken by a passenger or crew member, such as the depression of a button, the actuation of a lever, or the like.

Figure 2:
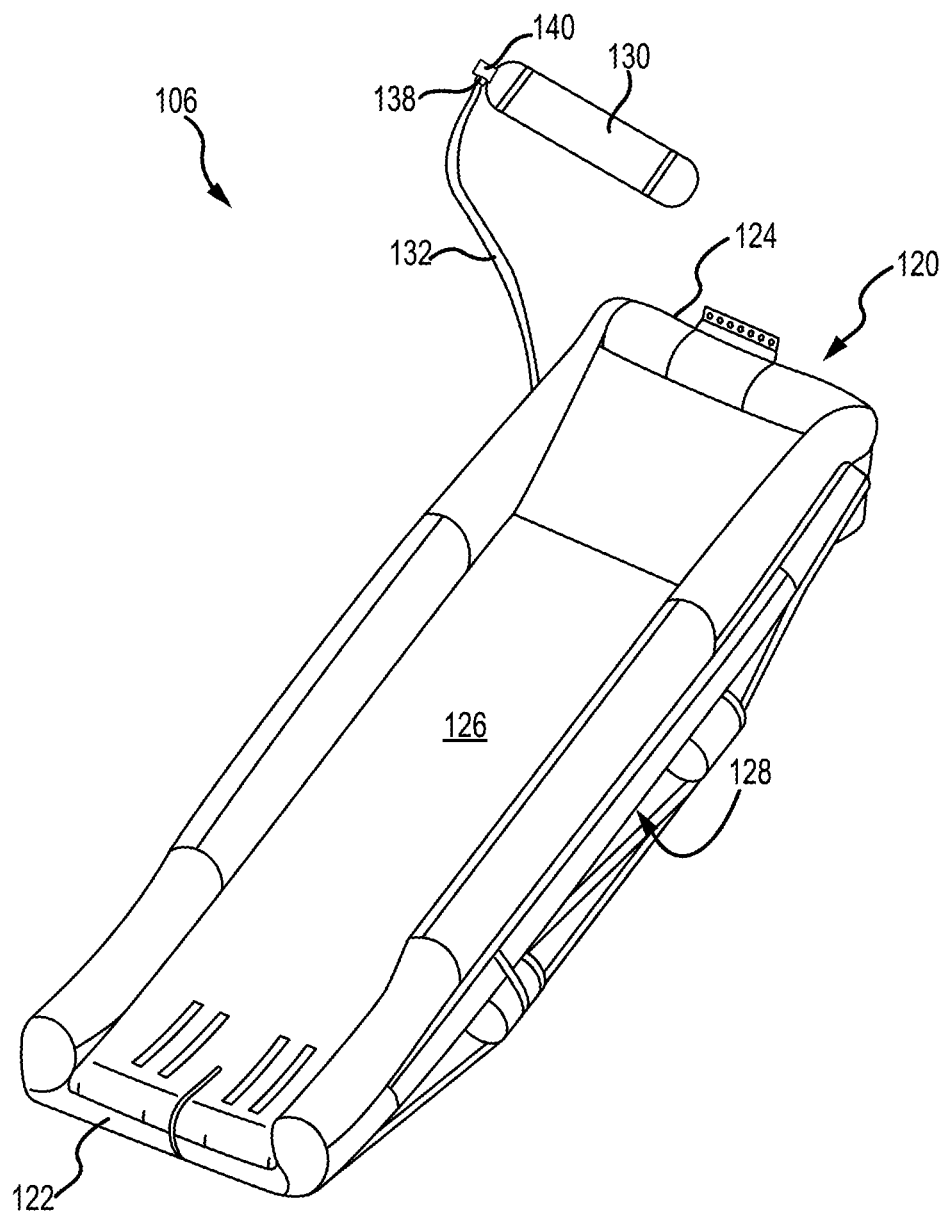
FIG. 2 illustrates an evacuation assembly with the evacuation slide in a deployed position, in accordance with various embodiments.

With reference to FIG. 2, additional details of evacuation assembly 106 are illustrated. In accordance with various embodiments, evacuation assembly 106 includes an evacuation slide 120 and a pressurized fluid source 130. In accordance with various embodiments, evacuation slide 120 includes a toe end 122 and a head end 124 opposite toe end 122. Head end 124 may be coupled to an aircraft structure (e.g., fuselage 102 in FIG. 1). In accordance with various embodiments, evacuation slide 120 is an inflatable slide. Evacuation slide 120 includes a sliding surface 126 and an underside surface 128 opposite sliding surface 126. Sliding surface 126 extends from head end 124 to toe end 122. During an evacuation event, underside surface 128 may be oriented toward an exit surface (e.g., toward the ground or toward a body of water). Evacuation slide 120 is illustrated as a single lane slide; however, evacuation slide 120 may comprise any number of lanes.

Evacuation assembly 106 includes pressurized fluid source 130 (also referred to as a charge cylinder). Pressurized fluid source 130 is configured to deliver a pressurized fluid, such as pressurized gas, to inflate evacuation slide 120. Pressurized fluid source 130 is fluidly coupled to evacuation slide 120. For example, pressurized fluid source 130 may be fluidly coupled to evacuation slide 120 via a hose, or conduit, 132. In response to receiving pressurized fluid from pressurized fluid source 130, evacuation slide 120 begins to inflate.

In accordance with various embodiments, conduit 132 may be connected to a valve outlet 138 of a valve assembly 140 (also referred to herein as a pressure regulator shutoff valve or a pressure reducing regulator) fluidly coupled to pressurized fluid source 130. In this regard, valve assembly 140 is fluidly coupled between pressurized fluid source 130 and conduit 132. As described in further detail below valve assembly 140 is configured to regulate the flow of pressurized fluid from pressurized fluid source 130 to evacuation slide 120. In this regard, when evacuation slide 120 is in a stowed (or deflated) state, valve assembly 140 is in a closed position. In response to deployment of evacuation assembly 106, valve assembly 140 may move or translate to an open position, thereby allowing fluid to flow from pressurized fluid source 130 to evacuation slide 120.

Figure 3A:
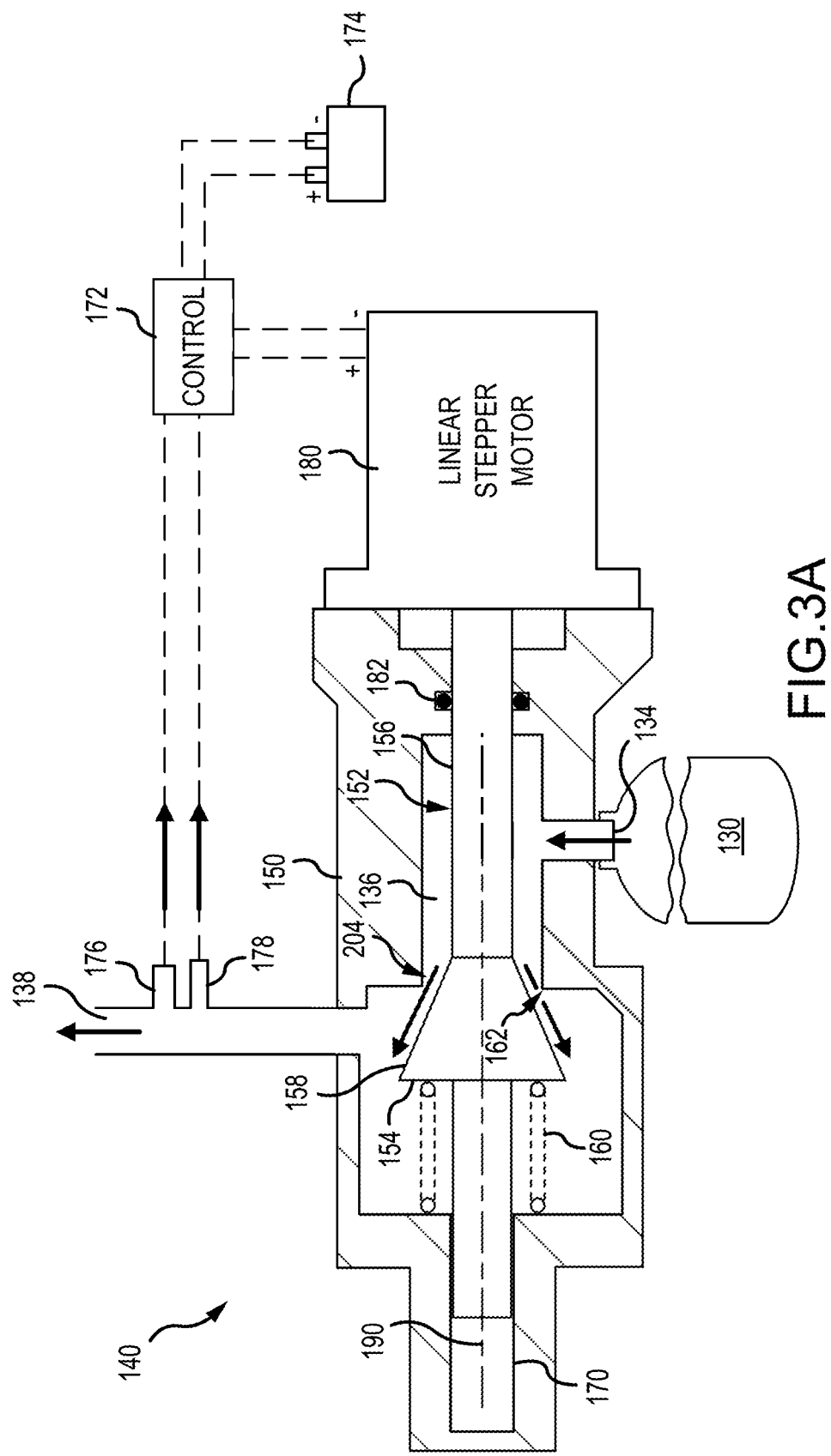
FIG. 3A and FIG. 3B illustrate schematic views of a pressurized fluid source pressure regulating valve assembly for an evacuation assembly with the pressure regulating valve in the open and closed positions, respectively, in accordance with various embodiments.

With reference to FIG. 3A, additional details of valve assembly 140 are schematically illustrated, in accordance with various embodiments. In various embodiments, valve assembly 140 includes a valve housing 150 (sometime referred to as a valve manifold). Valve housing 150 may extend along longitudinal axis 190. Valve housing 150 may be additively manufactured. Valve housing 150 may be manufactured using conventional machining methods. For example, the internally provided flow passages may be drilled from the extreme side faces and the relevant openings plugged afterwards.

Valve housing 150 may define valve outlet 138 and a valve inlet 134 of valve assembly 140. Valve assembly 140 receives fluid from pressurized fluid source 130 through valve inlet 134. Other components of pressurized fluid source 130 may also be coupled to valve housing 150. For example, in various embodiments, a pressure gauge, configured to measure a pressure of pressurized fluid source 130, may be operatively coupled to pressurized fluid source 130 via valve assembly 140. In various embodiments, a shutoff valve may be operatively coupled to pressurized fluid source 130 via valve assembly 140.

Valve housing 150 may further define a main fluid channel 136 through valve housing 150. In various embodiments, main fluid channel 136 is coaxial with longitudinal axis 190. Main fluid channel 136 may be fluidly connected with valve inlet 134 and valve outlet 138.

A regulating valve poppet 152 is located in main fluid channel 136. In the open position (see FIG. 3A), valve poppet 152 regulates the flow of pressurized fluid from pressurized fluid source 130 to valve outlet 138. In the open position, a spring 160 may bias the valve poppet 152 along longitudinal axis 190 in a first direction (i.e., to the right in FIG. 3A). After valve poppet 152 has moved to the closed position (see FIG. 3B), spring 160 may aid in securing valve poppet 152 in the closed position to prevent leakage between valve face 158 and valve seat land 162. Valve seat land 162 may at least partially define main fluid channel 136. In various embodiments, valve seat land 162 is round or oval in cross-section. Valve poppet 152 may comprise a plug 154 extending from a shaft 156 (also referred to as a valve stem). Plug 154 may comprise a disc shape. The working end of this plug 154, the valve face 158, may be oriented at an angle (e.g., a 45° (or other suitable angle) bevel) with respect to longitudinal axis 190 to seal against the corresponding valve seat land 162 formed into a rim of the main fluid chamber 164 being sealed. Shaft 156 may travel through a valve guide 170 to maintain its alignment. Valve guide 170 may comprise a bore configured to receive shaft 156.

Valve assembly 140 comprises a closed loop pressure control system including a control unit 172, one or more feedback sensors (e.g., temperature sensor 176 and/or pressure sensor 178), and a linear stepper motor 180. In various embodiments, control unit 172 may be preset with desired outlet pressure vs time values with which linear stepper motor 180 is controlled.

In various embodiments, control unit 172 may include one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, the control unit 172 controls, at least various parts of, and operation of various components of, the valve assembly 140. For example, the control unit 172 controls linear stepper motor 180.

Shaft 156 may be configured to translate along longitudinal axis 190 with the aid of a linear stepper motor 180. Linear stepper motor 180 may be mounted to valve housing 150. Linear stepper motor 180 may convert rotary movement (e.g., of a rotor) into linear movement (e.g., of shaft 156) in a known manner. Linear stepper motor 180 may be coupled to shaft 156. In various embodiments, shaft 156 is directly attached to linear stepper motor 180. Linear stepper motor 180 may be operated to translate shaft 156 along longitudinal axis 190 to increase and/or decrease a flow volume between valve face 158 and valve seat land 162 to regulate the flow of compressed fluid through valve housing 150 to maintain a desired outlet pressure.

A dynamic O-ring seal 182 may be provided to reduce the potential for the fluid medium contacting the electric motor of linear stepper motor 180. Seal 182 may be provided around shaft 156. Seal 182 may be disposed between valve housing 150 and shaft 156. In this regard, seal 182 may fluidically isolate the stepper motor 180 from the main fluid channel 136. In various embodiments, a fluid pressure force acting on seal 182 provides a closing force to valve poppet 152, which may ensure adequate leak tightness.

Control unit 172 may be provided to control the position of linear stepper motor 180 and thus the position of regulating valve poppet 152 with respect to valve seat land 162. Control unit 172 may receive temperature and/or pressure feedback (e.g., from temperature sensor 176 and/or pressure sensor 178) to control linear stepper motor 180. To increase a flow rate of compressed fluid through valve assembly 140, control unit 172 may cause valve poppet 152 to translate along longitudinal axis 190 in a second direction (i.e., to the left in FIG. 3A) to increase or open the gap between valve poppet 152 and valve seat land 162. To decrease a flow rate of compressed fluid through valve assembly 140, control unit 172 may cause valve poppet 152 to translate along longitudinal axis 190 in a first direction (i.e., to the right in FIG. 3A) to decrease or close the gap between valve poppet 152 and valve seat land 162.

Figure 3B:
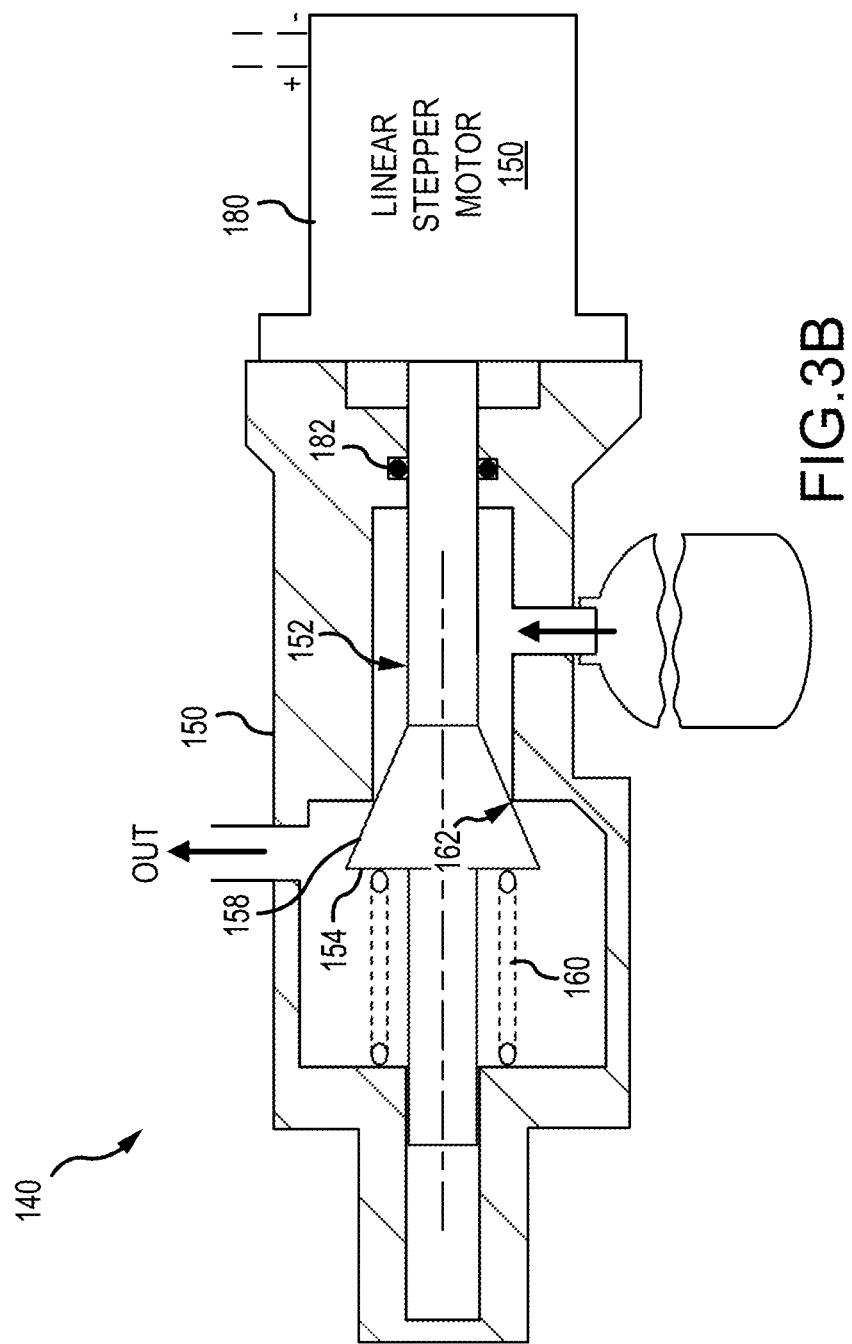

With reference to FIG. 3B, in the fully closed position, the conical poppet valve face 158 interfaces with valve seat land 162 of the control orifice body (i.e., housing 150). The desired closing force to ensure good leak tightness can be provided by maintaining appropriate force balancing. This may involve selection of appropriate spring 160 force, dynamic O-ring seal 182 size, and the conical poppet sealing area. Fluid leak tightness in the shut off position can be achieved by providing adequate sealing stress influenced by this net closing force, the seating land area, and the surface finishes of the seal and seat interfacing faces. Leak tightness can be improved further using a seat land bushing made of plastic material. In this manner, a separate flow shut off or isolation valve may not be necessary.

From the initial shut off position, when the stepper motor 180 is energized (e.g., with DC voltage pulses), it may develop electro mechanical force to actuate the valve poppet 152 in the opening direction (i.e., toward the left in FIG. 3B) and flow area may be established (see FIG. 3A). With reference to FIG. 3A, this flow area may replicate a conical frustum. This flow area (A) around the conical poppet profile region increases with valve stroke (x). Linear stepper motor 180 can be made to drive the valve poppet 152 in the closing direction (i.e., to the right in FIG. 3A) also by changing the electric polarity. For a given valve body orifice diameter, the flow area change with poppet movement (dA/dx) may be influenced by the shaping of conical poppet profile only. Linear stepper motor 180 operation may involve the application of DC voltage pulses. The number of DC voltage pulses per unit time feeding to the motor may determine the motor operating speed. This may directly control the valve poppet 152 stroke change with time (t). Thus, the resultant flow area change with time may be influenced by the profile design and the regulator valve operating speed.

As illustrated, the valve outlet pressure may be monitored by a pressure sensor 178 with feedback to the control unit 172. Control unit 172 may be pre-set with the desired outlet pressure values with an inflation time profile. Once the linear stepper motor 180 is energized to open valve poppet 152, if the outlet pressure measured is higher than the pre-set value, control unit 172 may generate a control command to linear stepper motor 180 actuating the valve poppet 152 to reduce the flow area by moving the valve poppet 152 in a closing direction. Conversely, if the pressure measured is less than pre-set value, then the pressure may be corrected by increasing the flow area. Control unit 172 may stop generating control command once the feed value matches with the preset value. Suitable algorithm(s) can be developed for processing of this pressure control or regulation taking the desired operational features. The control unit 172 can be embedded with processing software to achieve the desired pressures at the regulator outlet.

Figure 5:
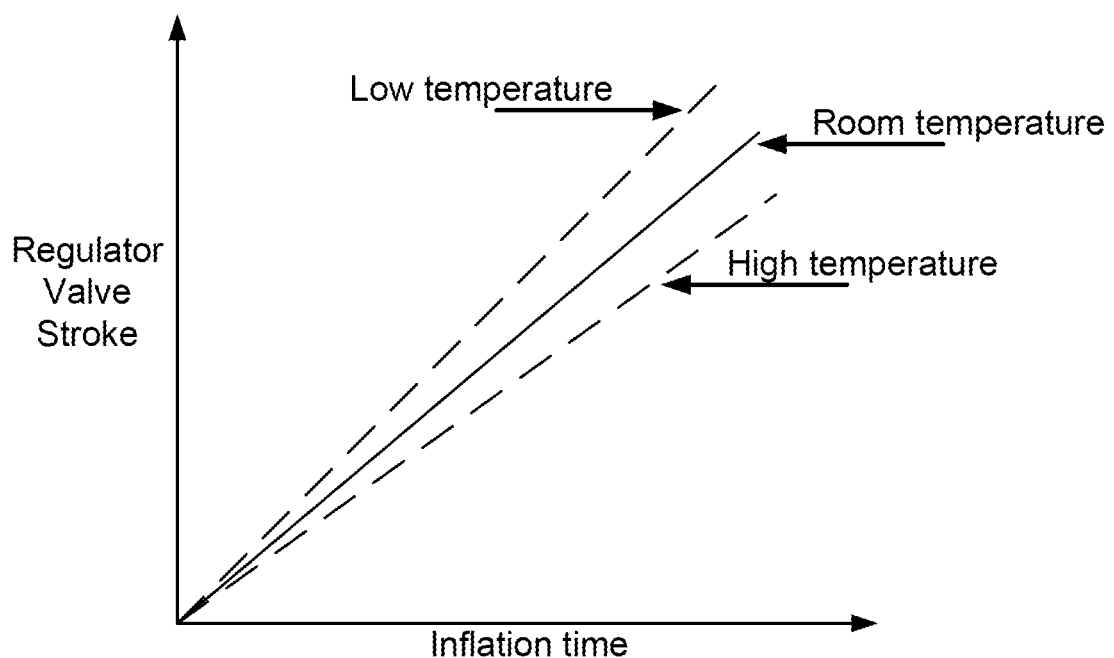
FIG. 5 illustrates a regulator valve stroke curve, in accordance with various embodiments.

With reference to FIG. 5, a chart illustrating regulator valve stroke versus inflation time for various temperatures is illustrated, in accordance with various embodiments. At lower temperatures, it may be desirable to increase the valve stroke or the opening area to achieve the same inflation time profile as for higher temperatures. Conversely, at higher temperatures, it may be desirable to reduce the valve stroke or decrease the opening area to achieve the same inflation time profile as for lower temperatures. Within the same time interval, these stroke vs time profiles can be achieved by varying the operating speed of linear stepper motor 180. For linear stepper motor 180, this may be achieved by varying the feed rate of input DC voltage pulses per second (pps). Higher pps may increase the speed and vice versa. The valve operating speed may be increased at higher temperatures and decreased at lower temperatures to achieve a desired inflation time. Stated differently, the rate or speed at which valve poppet 152 is translated toward a fully open position over inflation time may be increased at lower temperatures. Conversely, the rate or speed at which valve poppet 152 is translated toward a fully open position over inflation time may be decreased at higher temperatures. In this manner, with momentary reference to FIG. 3A, control unit 172 may receive temperature feedback from temperature sensor 176 and may vary the valve stroke speed based upon this temperature feedback. Temperature sensor 176 may measure the temperature of fluid flowing through (and/or out of) valve assembly 140.

A power source 174 may be provided for powering valve assembly 140. Power source 174 may power linear stepper motor 180. Power source 174 may power control unit 172. Power source 174 may power temperature sensor 176. Power source 174 may power pressure sensor 178. Power source 174 may be a battery, a super capacitor, and/or any other suitable power source.

Figure 6A:
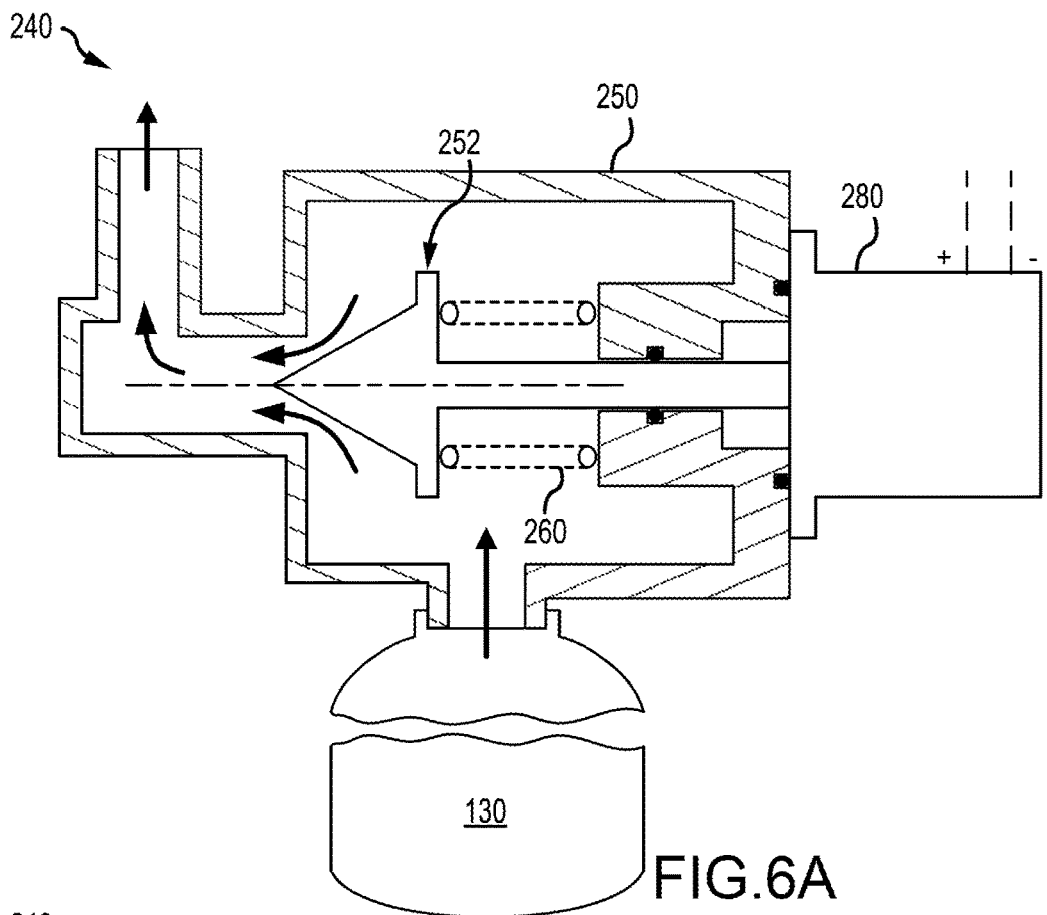
FIG. 6A and FIG. 6B illustrate schematic views of a pressurized fluid source pressure regulating valve assembly for an evacuation assembly with the pressure regulating valve in the open and closed positions, respectively, in accordance with various embodiments.
Figure 6B:
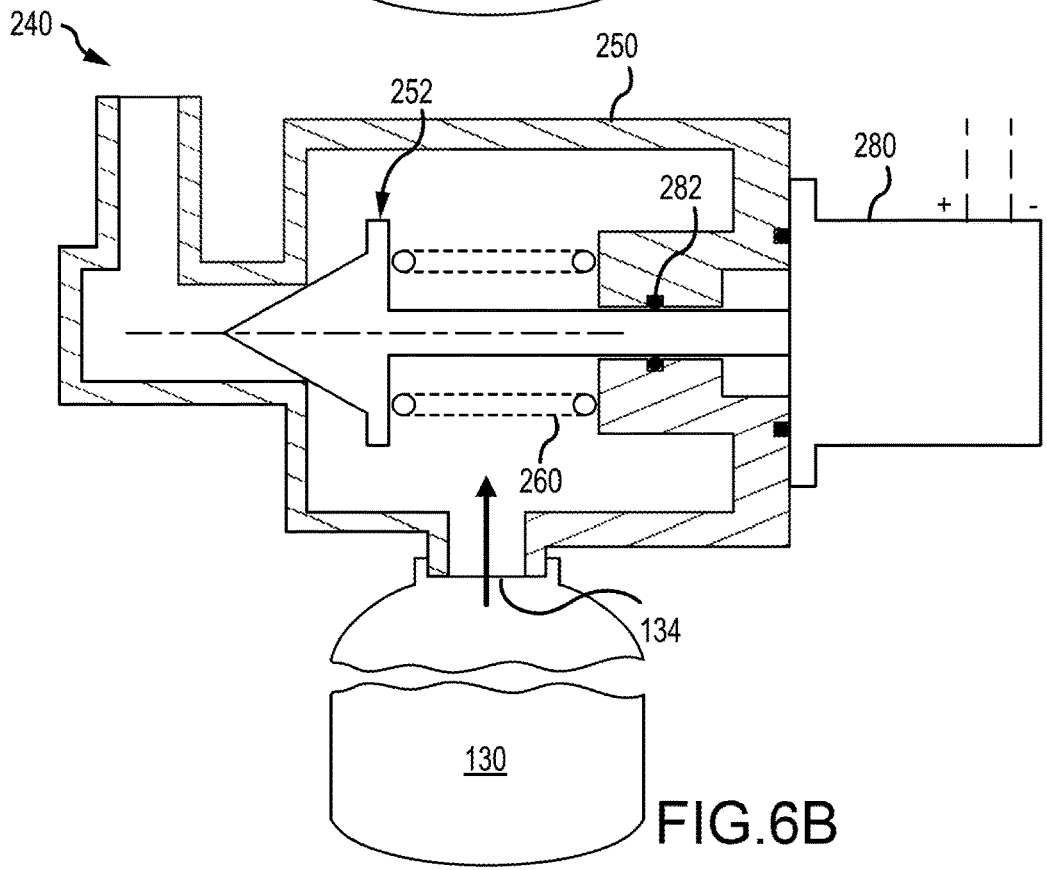

With combined reference to FIG. 6A and FIG. 6B, a valve assembly 240 is illustrated in an open position and closed position, respectively, in accordance with various embodiments. Valve assembly 240 may be similar to valve assembly 140, except that the flow force of valve assembly 240 acts in the valve closing direction, whereas in FIG. 3A, the flow forces are acting in the valve opening direction. The linear stepper motor 280 actuation force may be determined by the resistance force to operate the regulator valve in both the open and closing directions. The regulator valve designs discussed herein with respect to FIG. 3A and FIG. 6A may be analyzed for resistance force parameters to determine optimal regulator design. A motor with a higher margin on resistance torque may provide higher operating speed and/or faster response time.

In various embodiments, valve assembly 240 generally includes valve housing 250, valve poppet 252, and linear stepper motor 280. Valve assembly 240 may further include spring 260. Spring 260 may bias valve poppet 252 toward a closed position (see FIG. 6B). A dynamic O-ring seal 282 may be provided to avoid the fluid medium from contacting the electric motor of linear stepper motor 280. Seal 182 may be disposed between valve housing 150 and valve poppet 252. The closed loop pressure control system of valve assembly 240 is omitted for simplicity of illustration. However, it should be understood that valve assembly 240 may further include a control system similar to that of valve assembly 140 as illustrated in FIG. 4.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. A valve arrangement for a pressurized fluid source, the valve arrangement comprising:
   a valve housing comprising an inlet, an outlet, and a main fluid channel extending along a longitudinal axis of the valve housing;
   a regulating valve poppet located in the main fluid channel, the regulating valve poppet configured to translate along the longitudinal axis of the valve housing;
   a linear stepper motor configured to control a position of the regulating valve poppet;
   a pressure sensor located between the regulating valve poppet and the outlet;
   a temperature sensor located between the regulating valve poppet and the outlet; and
   a controller,
   wherein the controller is configured to receive a pressure feedback signal from the pressure sensor, and to control the linear stepper motor based upon the pressure feedback signal to maintain a substantially constant output pressure of the pressurized fluid source, wherein the controller is configured to receive a temperature feedback signal from the temperature sensor, and to vary the feed rate of input DC voltage pulses to the linear stepper motor, and wherein the controller is configured to vary the feed rate of input DC voltage pulses to the linear stepper motor based on preset outlet pressure vs. time values and based on preset valve stroke vs. inflation time values.

2. The valve arrangement of claim 1, wherein the regulating valve poppet comprises a shaft and a plug.

3. The valve arrangement of claim 2, further comprising a valve seat land, wherein a valve face of the plug is configured to abut the valve seat land when the regulating valve poppet is in a closed position, and the inlet is sealed from the outlet in response to the regulating valve poppet moving to the closed position.

4. The valve arrangement of claim 3, further comprising:
a spring abutting the plug, wherein the spring biases the plug towards the valve seat land; and
a dynamic O-ring seal configured to fluidically isolate the linear stepper motor from the main fluid channel.

5. The valve arrangement of claim 1, further comprising a power source for powering the linear stepper motor.

6. The valve arrangement of claim 1, wherein the controller is configured to vary a stroke speed of the regulating valve poppet based upon the temperature feedback signal.

7. The valve arrangement of claim 1, wherein the controller is configured to vary a stroke position of the regulating valve poppet based upon the pressure feedback signal.

8. The valve arrangement of claim 1, wherein the controller is configured to command the linear stepper motor to actuate the regulating valve poppet to reduce a flow area by moving the regulating valve poppet in a closing direction in response to the pressure feedback signal from the pressure sensor being more than a pre-set value.

9. The valve arrangement of claim 1, wherein the controller is configured to command the linear stepper motor to actuate the regulating valve poppet to increase a flow area by moving the regulating valve poppet in an opening direction in response to the pressure feedback signal from the pressure sensor being less than a pre-set value.

10. A valve arrangement for a pressurized fluid source, the valve arrangement comprising:
a valve housing comprising an inlet, an outlet, and a main fluid channel;
a regulating valve poppet located in the main fluid channel, the regulating valve poppet configured to translate along a longitudinal axis;
a linear stepper motor configured to control a position of the regulating valve poppet;
a pressure sensor located between the regulating valve poppet and the outlet;
a temperature sensor located between the regulating valve poppet and the outlet; and
a controller, wherein the controller is configured to receive a pressure feedback signal from the pressure sensor, and to control the linear stepper motor based upon the pressure feedback signal to maintain a substantially constant output pressure of the pressurized fluid source,
wherein the controller is configured to receive a temperature feedback signal from the temperature sensor, and to vary the feed rate of input DC voltage pulses to the linear stepper motor,
wherein the outlet is fluidly disconnected from the inlet when the regulating valve poppet is in a closed position,
the outlet is fluidly connected with the inlet when the regulating valve poppet is in an open position, and
wherein the controller is configured to vary the feed rate of input DC voltage pulses to the linear stepper motor based on preset outlet pressure vs. time values and based on preset valve stroke vs. inflation time values.

11. The valve arrangement of claim 10, wherein the main fluid channel fluidly connects the inlet and the outlet.

12. The valve arrangement of claim 10, wherein the controller is configured to vary a stroke speed of the regulating valve poppet based upon the temperature feedback signal.

13. The valve arrangement of claim 10, wherein the controller is configured to vary a stroke position of the regulating valve poppet based upon the pressure feedback signal.

14. The valve arrangement of claim 13, further comprising a spring configured to bias the regulating valve poppet toward the closed position.

15. The valve arrangement of claim 10, wherein the controller is configured to command the linear stepper motor to actuate the regulating valve poppet to reduce a flow area by moving the regulating valve poppet in a closing direction in response the pressure feedback signal from the pressure sensor being more than a pre-set value.

16. An evacuation assembly, comprising:
a pressurized fluid source; and
a valve assembly configured to control a flow of pressurized fluid from the pressurized fluid source, the valve assembly comprising:
a valve housing comprising an inlet, an outlet, and a main fluid channel extending along a longitudinal axis of the valve housing;
a regulating valve poppet located in the main fluid channel, the regulating valve poppet configured to translate along the longitudinal axis of the valve housing;
a linear stepper motor mounted to the valve housing and configured to control a position of the regulating valve poppet; and
a pressure sensor located between the regulating valve poppet and the outlet;
a temperature sensor located between the regulating valve poppet and the outlet; and
a controller,
wherein the controller is configured to receive a pressure feedback signal from the pressure sensor, and to control a position of the linear stepper motor based upon the pressure feedback signal to maintain a substantially constant output pressure of the pressurized fluid source,
wherein an operating speed of the linear stepper motor is variable based upon a temperature feedback signal received from the temperature sensor, and
wherein the controller is configured to vary the operating speed of the linear stepper motor based on preset outlet pressure vs. time values and based on preset valve stroke vs. inflation time values.

17. The evacuation assembly of claim 16, further comprising an evacuation slide fluidly coupled to the valve outlet.

* * * * *